United States Patent [19]
Norton

[11] 3,866,957
[45] Feb. 18, 1975

[54] PLUG ASSEMBLY
[75] Inventor: James F. Norton, Berea, Ohio
[73] Assignee: The Hansen Manufacturing Company, Cleveland, Ohio
[22] Filed: Aug. 17, 1973
[21] Appl. No.: 389,166

[52] U.S. Cl. ............................................. 285/316
[51] Int. Cl. ............................................ F16l 37/18
[58] Field of Search ............ 285/316, 83, 277, 349, 285/315, 314

[56] References Cited
UNITED STATES PATENTS

| | | | |
|---|---|---|---|
| 2,750,209 | 6/1956 | Robb | 285/277 X |
| 3,120,968 | 2/1964 | Calvin | 285/277 |
| 3,351,362 | 11/1967 | Hansen | 285/83 |
| 3,423,110 | 1/1969 | Hansen et al. | 285/277 |
| 3,561,725 | 2/1971 | Torres | 285/277 X |

Primary Examiner—H. Hampton Hunter

[57] ABSTRACT

An improved plug assembly includes a hard metal ring which is engaged by locking balls of a socket assembly. The hard metal ring has a circular cross sectional configuration and is disposed in an annular groove in the relatively soft metal of the plug body. When the plug body is inserted into the socket assembly, the locking balls engage the hard metal ring rather than the plug body. Due to the hardness of the ring, the plug assembly has a relatively long service life.

3 Claims, 5 Drawing Figures

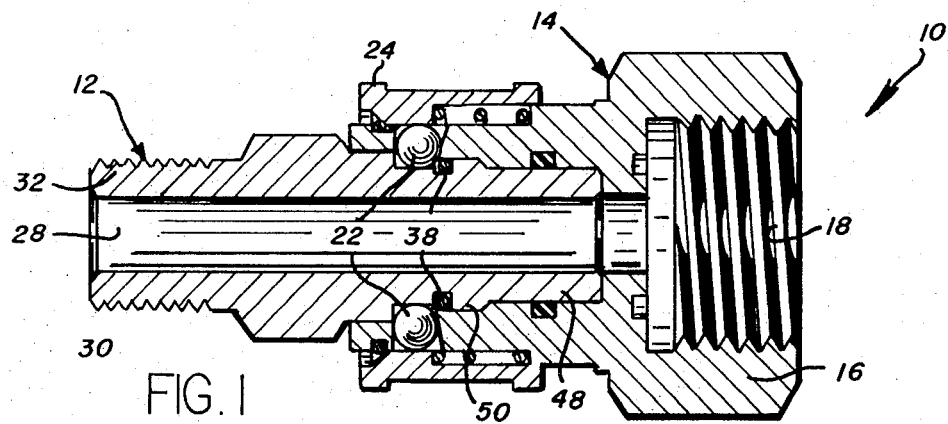
FIG. 1
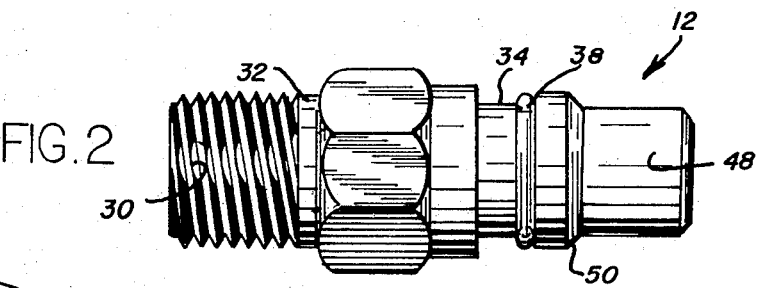
FIG. 2
FIG. 3
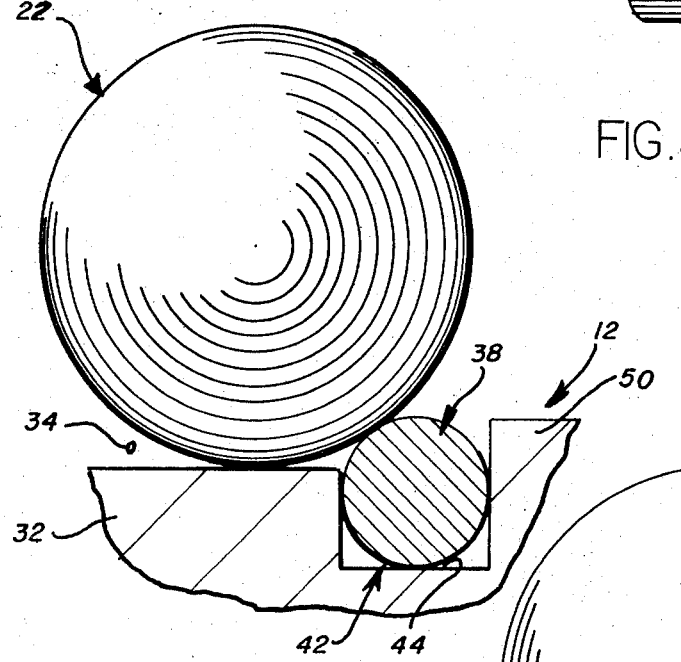
FIG. 4
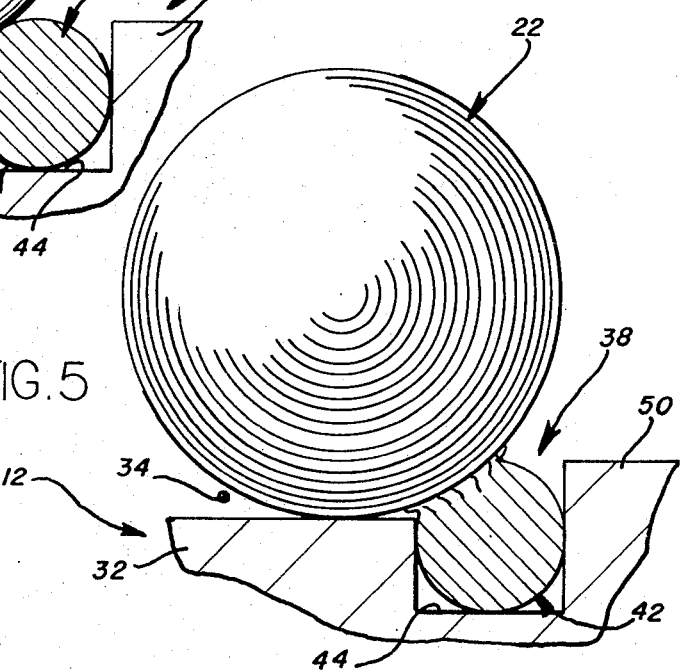
FIG. 5

3,866,957

PLUG ASSEMBLY

BACKGROUND OF THE INVENTION

This invention relates generally to a plug assembly and more specifically to a plug assembly having a hard metal ring which is engaged by locking elements when the plug assembly is inserted into a socket.

There are many known couplings which include a plug which is received in a socket assembly to connect a pair of conduits in fluid communication. One of these known couplings is disclosed in U.S. Pat. No. 3,351,362 to H. J. Hansen. The socket assembly includes a plurality of locking balls which grip the plug when the coupling is connected. Since the locking balls are commonly made of a very hard steel, the soft metal of the plug body is gradually deformed over an extended period of use. When the locking balls have sufficiently deformed the plug body, the plug must be replaced.

In an attempt to improve the service life of the plug, a hardened steel ring has previously been mounted in a groove on the plug body. This known hardened steel ring had a rectangular base which was received in the groove in the plug body and an outward projecting hump which was engaged by the locking balls of a socket assembly. The use of a hardened steel ring increased the operating life of the prior art plug assembly. However, the hardened steel ring was relatively expensive to produce so that the volume production of plug assemblies with these hardened steel rings was not commerically feasible. The relatively high cost of the hardened steel rings resulted from the fact that the ring was machined from bar stock, slotted and then heat-treated in a sizing fixture. Distortion and wear of the sizing fixture required replacement or rework of the fixture between each heat treat. Of course, this resulted in a relatively high cost of producing the ring.

Another known plug assembly includes an annular recess with a fiber glass reinforced lining and is disclosed in German offenlegungschrift No. 1,904,927. A chrome-nickel wire is embedded in the fiber glass lining. When the plug assembly is inserted into a socket assembly, the locking balls of the socket assembly engage the fiber glass lining rather than the plug body.

SUMMARY OF THE PRESENT INVENTION

The present invention provides a new and improved plug assembly which is economical to manufacture and which has a hard ring which is engaged by the locking elements or balls of a socket assembly when the plug assembly is inserted into the socket assembly. The hard steel ring has a circular cross sectional configuration and can be economically manufactured from commercially available spring temper stainless steel wire. Of course, the ring could be formed of other materials.

Accordingly, it is an object of this invention to provide a new and improved plug assembly having a body upon which a relatively hard metal ring with a circular cross sectional configuration is disposed at a location where the metal ring will be engaged by locking elements of a socket assembly when the plug assembly is inserted into the socket assembly.

BRIEF DESCRIPTION OF THE DRAWINGS

The foregoing and other objects and features of the present invention will become more apparent upon a consideration of the following description taken in connection with the accompanying drawings wherein:

FIG. 1 is a cross sectional view of a coupling having an improved plug assembly constructed in accordance with the present invention;

FIG. 2 is an illustration depicting the construction of the plug assembly;

FIG. 3 is an enlarged plan view of a hard metal ring which forms part of the plug assembly of FIG. 2;

FIG. 4 is an enlarged schematic illustration depicting the relationship between the hard metal ring of FIG. 3 and a locking ball of a socket assembly of FIG. 1; and FIG. 5 is an enlarged schematic illustration, generally similar to FIG. 4, illustrating the configuration of the hard metal ring after the plug assembly has been utilized for a period of time in association with the socket assembly of FIG. 1.

DESCRIPTION OF ONE SPECIFIC PREFERRED EMBODIMENT OF THE INVENTION

A coupling 10 includes an improved plug assembly 12 which is received in a known socket assembly 14 (see FIG. 1). The socket assembly 14 includes a socket body 16 having a threaded end portion 18 which is adapted to be connected to a suitable fluid conduit. A plurality of spherical locking balls 22 are disposed in an annular array about the socket body 16. The locking balls 22 are held in engagement with the plug assembly 12 by a cylindrical latch sleeve 24. Since the general construction and mode of operation of the socket assembly 14 is well known, it will not be further described in order to avoid prolixity of description.

The plug assembly 12 has a cylindrical central passage 28 for conducting fluid between the socket assembly 14 and a conduit (not shown) connected with a threaded end portion 30 of a plug body 32. The plug body 32 is provided with an annular recess 34 (see FIG. 2) which receives the locking balls 22 when the plug assembly 12 is inserted into the socket assembly 14.

In accordance with the present invention, a hard metal ring 38 (FIG. 3) circumscribes the plug body 32 and is engaged by the locking balls 22 in the manner illustrated schematically in FIG. 4. Since the ring 38 is formed of a relatively hard metal, such as 18-8 spring temper stainless steel, the ring resists deformation by the locking balls 22. The plug assembly 12 has a relatively long service life since the locking balls 22 are pressing against the hard metal ring 38 rather than the relatively soft metal of the plug body 32.

The ring 38 is economically made from commercially available stainless steel wire having a circular cross sectional configuration. The stainless steel wire is bent to form a snap ring 38 having an annular configuration (FIG. 3). The ends 39 and 40 of the snap ring 38 abut each other when the ring is in a relaxed or unsprung condition. The annular snap ring 38 is received in an annular groove 42 formed in the bottom of the recess 34 (FIG. 4). The metal ring 38 is formed with an inside diameter which, when the metal ring is relaxed, is slightly less than the diameter of an annular surface 44 at the bottom of the groove 42.

When the plug assembly 12 is being assembled, the metal ring 38 is slipped over a leading end portion 48 (see FIG. 2) of the plug body 32. The metal ring 38 is then forced over an annular bulge 50 formed in the plug body. As the ring 38 is forced over the bulge 50, the ring is resiliently deflected and the wire ends 39 and 40 separate somewhat. After the ring 38 has been forced over the bulge 50, it resiliently contracts into the groove 42. Since the bottom surface 44 of the groove 42 has a diameter which is slightly greater than the relaxed diameter of the ring 38, the ring is resiliently deflected by the plug body 32 and firmly grips the plug body.

During continued use of the plug assembly 12, the steel locking balls 22 will gradually deform the ring 38, in the manner illustrated schematically in FIG. 5. However, this deformation occurs over a relatively long time period since the ring is very hard. Of course, the plug 12 with the stainless steel ring 38 has a substantially longer service life than a plug in which the locking balls 22 directly engage the relatively soft metal of the plug body. For example, a plug having a body which is engaged directly by the locking balls 22 and which is made of brass or soft steel would have a far shorter service life than would a plug having a body constructed of the same material and the annular ring 38 to prevent deformation of the plug body by the locking balls.

Since the annular ring 38 is formed of commercially available stainless steel wire having a circular cross sectional configuration, the ring 38 is relatively inexpensive to fabricate. Therefore, the cost of constructing the plug assembly 12 is only slightly greater than the cost of fabricating a plug having a body made out of the same material as the body 32 of the plug assembly 12. Although the cost of fabricating the plug assembly 12 is only slightly greater than the cost of fabricating a similar plug assembly without the hard ring 38, the plug assembly 12 will have a much longer service life. In fact, it is contemplated that when the ring 38 becomes excessively deformed due to the influence of the locking balls, the ring 38 could be removed from the groove 42 and a new ring positioned therein at a relatively low cost to thereby rebuild the plug assembly 12.

In view of the foregoing description, it can be seen that the coupling 10 includes a plug assembly 12 having a hard ring 38 disposed on the plug body 32 for engagement with the locking balls or elements 22. This annular metal ring 38 is disposed in abutting engagement with the plug body and is formed of a metal which is harder than the metal forming the plug body. The groove 42 holds the metal ring in a position in which it is engaged by the outer surface of the locking balls 22 when the plug assembly 12 is inserted into the socket assembly 14. Since the metal ring can be formed of commercially available stainless steel or other hard metal wire, it is relatively inexpensive to fabricate.

Although the socket assembly 14 has been shown as having spherical locking balls 22, it is contemplated that the socket assembly could be provided with locking elements of a different configuration. For example, roller type locking types similar to those disposed in U.S. Pat. No. 3,423,110 could be utilized. It should also be understood that although it is contemplated that the plug body 32 will be formed of a metal, such as a relatively soft steel or brass, it is contemplated that the plug body could be formed of a suitable polymeric material. In addition, it should be understood that although the ring 38 has been described herein as being made of stainless steel it is contemplated that the ring could be made of other metals which are substantially harder than the material from which the plug body is formed.

Having described a specific preferred embodiment of the invention, the following is claimed:

1. In a coupling for interconnecting fluid conduits and including a plug having a body and a socket assembly for receiving at least a portion of said plug body and having locking elements for engaging said plug to hold it against axial movement relative to said socket assembly, the improvement comprising ring means disposed on said plug body for abutting engagement with said locking elements, said ring means including an annular metal ring disposed in abutting engagement with said plug body and formed of a metal which is harder than the material forming said plug body, said ring having a circular cross sectional configuration in a radially extending plane and an outer surface which is engaged by said locking elements when said plug body is received in said socket assembly.

2. A plug assembly adapted to be associated with a socket having a plurality of locking elements for engaging said plug assembly to hold it against axial movement, said plug assembly comprising a plug body at least a portion of which is adapted to be received in said socket, said plug body being formed of a first material and having an internal surface defining a fluid passage, said plug body including external surface means for defining a generally circular groove circumscribing said plug body, and ring means for engaging the locking elements when said plug body is received in said socket, said ring means including an annular ring disposed in said circular groove in abutting engagement with said external surface means, said annular ring being formed of a second material which is substantially harder than said first material and having a circular cross sectional configuration in a radially extending plane.

3. A plug assembly as set forth in claim 2 wherein said second material is stainless steel and said first material is a metal which is softer than stainless steel.

* * * * *